United States Patent
Song et al.

(10) Patent No.: US 9,365,443 B2
(45) Date of Patent: Jun. 14, 2016

(54) WATER SOFTENING APPARATUS

(71) Applicant: SAMSUNG ELECTRONICS CO., LTD., Suwon-si (KR)

(72) Inventors: Myung Seob Song, Yongin-si (KR); Young Chul Ko, Suwon-si (KR); In Jo Jeong, Bucheon-si (KR); Yin Mingming, Suwon-si (KR); Moon Il Jung, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 344 days.

(21) Appl. No.: 13/969,844

(22) Filed: Aug. 19, 2013

(65) Prior Publication Data

US 2014/0158542 A1 Jun. 12, 2014

(30) Foreign Application Priority Data

Aug. 20, 2012 (KR) .................. 10-2012-0090879

(51) Int. Cl.
| | |
|---|---|
| *C02F 5/00* | (2006.01) |
| *C02F 1/00* | (2006.01) |
| *C02F 1/46* | (2006.01) |
| *C02F 1/469* | (2006.01) |
| *C02F 1/68* | (2006.01) |
| *B08B 9/00* | (2006.01) |

(52) U.S. Cl.
CPC ... *C02F 5/00* (2013.01); *B08B 9/00* (2013.01); *C02F 1/004* (2013.01); *C02F 1/4602* (2013.01); *C02F 1/4691* (2013.01); *C02F 1/686* (2013.01); *C02F 2201/004* (2013.01); *C02F 2201/005* (2013.01); *C02F 2209/44* (2013.01); *C02F 2303/16* (2013.01)

(58) Field of Classification Search
CPC ........... B01D 61/48; C02F 5/00; C02F 1/283; C02F 1/441; C02F 1/46; C02F 2209/00; C02F 2301/066; C02F 2209/02; C02F 2209/03; C02F 2209/05; C02F 2209/06; C02F 2209/11; C02F 2209/40; C02F 2209/006
See application file for complete search history.

(56) References Cited

U.S. PATENT DOCUMENTS

2006/0169624 A1* 8/2006 Radomyselski ....... B01D 15/00
 210/96.1
2006/0231495 A1 10/2006 Freydina et al.

FOREIGN PATENT DOCUMENTS

| CN | 202011768 | 10/2011 |
|---|---|---|
| EP | 2341032 A2 | 7/2011 |

(Continued)

OTHER PUBLICATIONS

Extended European Search Report issued Nov. 22, 2013 in corresponding European Application No. 13180779.4.

*Primary Examiner* — Walter D Griffin
*Assistant Examiner* — Cameron J Allen
(74) *Attorney, Agent, or Firm* — Staas & Halsey LLP

(57) ABSTRACT

Disclosed herein is a water softening apparatus including an electrosorption unit to adsorb foreign matter contained in water with electrical attraction, a preprocessing unit having a preprocessing chamber which is connected with an external water supply source and is provided with a filter to filter out foreign matter contained in water transferred from the external water supply source, and a cleaning solution supply unit having a cleaning solution storage chamber which stores a cleaning solution to be supplied to the electrosorption unit. Since any one of the water transferred from the preprocessing unit and the cleaning solution transferred from the cleaning solution supply unit is selectively transferred to the electrosorption unit by a valve, a pump to inject the cleaning solution and the like are unnecessary.

15 Claims, 6 Drawing Sheets

(56) References Cited

FOREIGN PATENT DOCUMENTS

| | | | |
|---|---|---|---|
| EP | 2341032 A3 | 7/2011 | |
| KR | 10-2011-0027310 | 3/2011 | |
| WO | 2011/094852 | 8/2011 | |
| WO | 2011/121436 A1 | 10/2011 | |
| WO | WO 2011121436 A1 * | 10/2011 | ............ C02F 1/4691 |

* cited by examiner

WATER SOFTENING APPARATUS

CROSS-REFERENCE TO RELATED APPLICATIONS

This application claims the benefit of Korean Patent Application No. 10-2012-90879, filed on Aug. 20, 2012 in the Korean Intellectual Property Office, the disclosure of which is incorporated herein by reference.

BACKGROUND

1. Field

Embodiments of the present disclosure relate to a water softening apparatus including an electrosorption unit which adsorbs foreign matter contained in water with electrical attraction.

2. Description of the Related Art

Water softening apparatuses remove a variety of foreign matter contained in water supplied from an external water supply source to soften the water. Among such water softening apparatuses, there is recently a water softening apparatus including an electrosorption unit which adsorbs foreign matter with electrical attraction.

The electrosorption unit includes a pair of electrodes which are disposed to be spaced apart from each other and to which power of opposite polarities is applied, and ionic binders which are disposed on surfaces of the two electrodes to adsorb ionized matter.

Accordingly, anionic matter is induced to the electrode side to which an anode is applied to be adsorbed onto the ionic binder, and cationic matter is induced to the electrode side to which a cathode is applied to be adsorbed onto the other ionic binder. Therefore, foreign matter contained in water is removed to complete softening of the water.

In a case of the water softening apparatus operated in this manner, scale is generated in the electrosorption unit by ionized matter collected within the electrosorption unit, and performance of the water softening apparatus is deteriorated as the scale is accumulated. Therefore, there is a need to periodically supply a cleaning solution to the electrosorption unit so as to remove the scale accumulated in the electrosorption unit.

SUMMARY

Therefore, it is an aspect to provide a water softening apparatus capable of more efficiently supplying a cleaning solution.

Additional aspects will be set forth in part in the description which follows and, in part, will be obvious from the description, or may be learned by practice of the invention.

In accordance with one aspect, a water softening apparatus includes an electrosorption unit to adsorb foreign matter contained in water with electrical attraction, a preprocessing unit having a preprocessing chamber which is connected with an external water supply source and is provided with a filter to filter out foreign matter contained in water transferred from the external water supply source, a cleaning solution supply unit having a cleaning solution storage chamber which stores a cleaning solution to be supplied to the electrosorption unit, and at least one valve which allows any one of the water transferred from the preprocessing unit and the cleaning solution transferred from the cleaning solution supply unit to be selectively transferred to the electrosorption unit.

The cleaning solution storage chamber may be connected with the preprocessing chamber to be supplied with the water from the preprocessing chamber, and the cleaning solution supply unit may include a diaphragm which moves depending on pressure of the water transferred from the preprocessing unit.

The water softening apparatus may further include a housing which is provided so that the preprocessing chamber and the cleaning solution storage chamber are partitioned by a partition wall, and the partition wall may be provided with a communication hole to connect the preprocessing chamber and the cleaning solution storage chamber.

The cleaning solution supply unit may be connected with the preprocessing unit to be supplied with the water from the preprocessing unit, and the cleaning solution supply unit may include a check valve which allows the water in the preprocessing unit to be transferred to the cleaning solution supply unit.

The water softening apparatus may further include a housing which is provided so that the preprocessing chamber and the cleaning solution storage chamber are partitioned by a partition wall, the partition wall may be provided with a communication hole which connects the preprocessing chamber and the cleaning solution storage chamber, and the check valve may open and close the communication hole.

The cleaning solution supply unit may include a piston which is movably mounted in the cleaning solution storage chamber, and an elastic member to elastically support the piston.

The water softening apparatus may further include a water guide tube to guide the water discharged from the preprocessing chamber, a cleaning solution guide tube to guide the cleaning solution discharged from the cleaning solution storage chamber, and a transfer tube, one end of which is connected with the water guide tube and the cleaning solution guide tube, and the other end of which is connected to the electrosorption unit.

The at least one valve may include a three way valve which is arranged at a connection part of the water guide tube, the cleaning solution guide tube, and the transfer tube, and allows any one of the water guide tube and the cleaning solution guide tube to communicate with the transfer tube.

The at least one valve may include a water valve which is arranged at the water guide tube to open and close the water guide tube, and a cleaning solution valve which is arranged at the cleaning solution guide tube to open and close the cleaning solution guide tube.

The water softening apparatus may further include an orifice which is arranged at the cleaning solution guide tube.

The water softening apparatus may further include a water supply tube to guide the water from the external water supply source to the preprocessing chamber, and a constant pressure unit which is arranged at the water supply tube and allows pressure of the water transferred to the preprocessing chamber to be held constant.

In accordance with one aspect, a water softening apparatus includes an electrosorption unit to adsorb foreign matter contained in water with electrical attraction, a housing provided so that a preprocessing chamber, which is provided with a filter and forms a preprocessing unit, and a cleaning solution storage chamber, which stores a cleaning solution and forms a cleaning solution supply unit, are partitioned by a partition wall, and at least one valve which allows any one of water transferred from the preprocessing chamber and the cleaning solution transferred from the cleaning solution storage chamber to be selectively transferred to the electrosorption unit.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
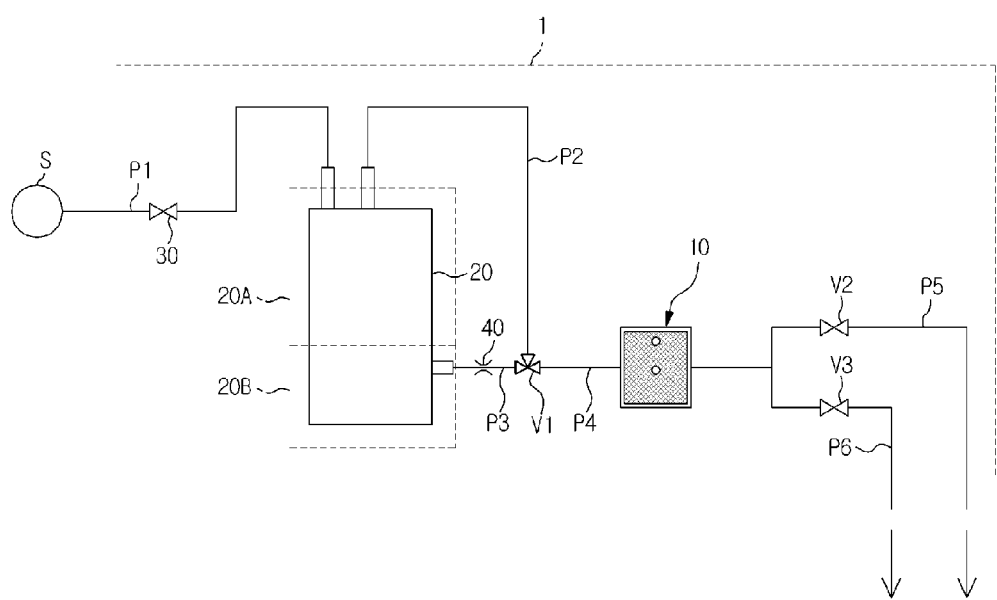
FIG. 1 is a view schematically illustrating a water softening apparatus according to an embodiment.

Reference will now be made in detail to the embodiments, examples of which are illustrated in the accompanying drawings, wherein like reference numerals refer to like elements throughout.

As shown in FIG. 1, a water softening apparatus 1 according to an embodiment an electrosorption unit 10 which is supplied with water from an external water supply source S and filters out foreign matter contained in the water, a preprocessing unit 20A which is disposed between the external water supply source S and the electrosorption unit 10 and filters out foreign matter contained in the water transferred from the external water supply source S to the electrosorption unit 10, a cleaning solution supply unit 20B to supply the electrosorption unit 10 with a cleaning solution, and at least one valve V1 which allows any one of the water passing through the preprocessing unit 20A and the cleaning solution supplied from the cleaning solution supply unit 20B to be selectively transferred to the electrosorption unit 10.

The electrosorption unit 10 includes therein a pair of electrodes (not shown) which are disposed to be spaced apart from each other and to which power of opposite polarities is applied, an ionic binder layer (not shown) which adsorbs ionized matter in water induced by electrical attraction generated from the two electrodes, and the like.

Figure 2:
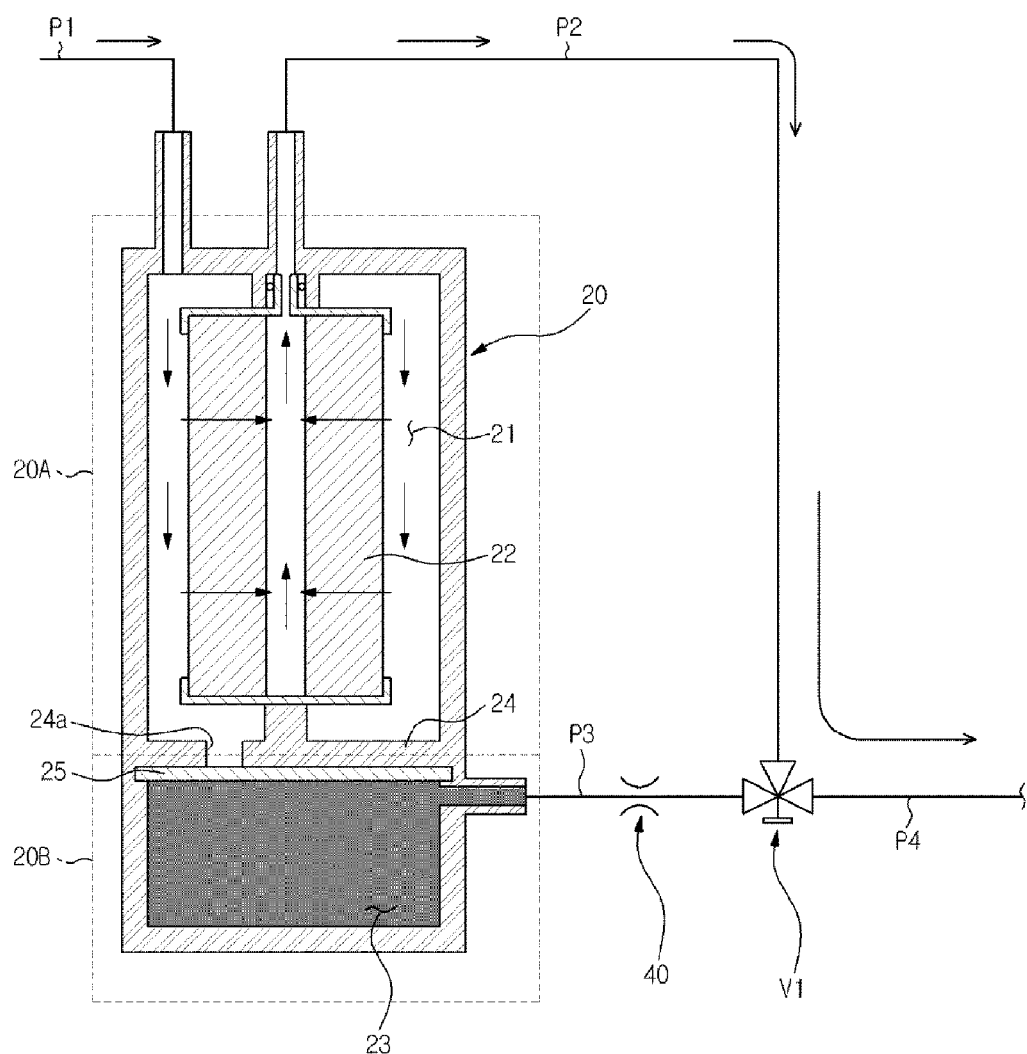
FIG. 2 is a view schematically illustrating a preprocessing unit and a cleaning solution supply unit applied to the water softening apparatus according to the embodiment.

As shown in FIG. 2, the preprocessing unit 20A includes a preprocessing chamber 21 which is connected with the external water supply source S to be supplied with water from the external water supply source S, and a circular filter 22 arranged within the preprocessing chamber 21.

The cleaning solution supply unit 20B includes a cleaning solution storage chamber 23 to store the cleaning solution. In the present embodiment, the cleaning solution supply unit 20B is connected with the preprocessing unit 20A and allows the cleaning solution in the cleaning solution storage chamber 23 to be transferred to the electrosorption unit 10 by the water transferred from the preprocessing unit 20A. To this end, the cleaning solution supply unit 20B includes a diaphragm 25 which is disposed within the cleaning solution storage chamber 23 and pushes the cleaning solution from the cleaning solution storage chamber 23 while moving by the pressure of water transferred from the preprocessing unit 20A. Citric acid is used as the cleaning solution stored in the cleaning solution storage chamber 23 in the present embodiment, but the present invention is not limited thereto. For example, hydrochloric acid, sulfuric acid, or acidic water may be used.

In the present embodiment, the preprocessing unit 20A and the cleaning solution supply unit 20B share a single housing 20. In the housing 20, the preprocessing chamber 21 and the cleaning solution storage chamber 23 are provided to be partitioned by a partition wall 24 so that the preprocessing chamber 21 and the filter 22 form the preprocessing unit 20A and the cleaning solution storage chamber 23 and the diaphragm 25 form the cleaning solution supply unit 20B.

Accordingly, since the housing 20 is provided with the preprocessing chamber 21 and the cleaning solution storage chamber 23 and the preprocessing unit 20A and the cleaning solution supply unit 20B share the single housing 20, the water softening apparatus 1 has a simple structure.

The above-mentioned components are connected to each other through a plurality of tubes P1 to P6 to transfer the cleaning solution or water. These tubes P1 to P6 include a water supply tube P1 connected with the external water supply source S, a water guide tube P2 to guide the water discharged from the preprocessing chamber 21, a cleaning solution guide tube P3 to guide the cleaning solution discharged from the cleaning solution storage chamber 23, a transfer tube P4, one end of which is connected with the water guide tube P2 and the cleaning solution guide tube P3 and the other end of which is connected to the electrosorption unit 10, so as to transfer the cleaning solution or water to the electrosorption unit 10, a water discharge tube P5 to guide discharge of the water in which softening of water is completed in the electrosorption unit 10 during a water softening operation, a scale discharge tube P6 to guide discharge of the cleaning solution and scale discharged from the electrosorption unit 10 during a cleaning operation, and the like.

The valve V1 is a three way valve, and is arranged at a connection part to which the water guide tube P2, the cleaning solution guide tube P3, and the transfer tube P4 are connected. The valve V1 allows any one of the water transferred from the preprocessing chamber 21 and the cleaning solution supplied from the cleaning solution storage chamber 23 to be selectively transferred to the electrosorption unit 10 through the transfer tube P4.

In addition, opening and closing valves V2 and V3 are respectively arranged at the water discharge tube P5 and the scale discharge tube P6. Consequently, when the water softening apparatus performs the water softening operation, the water may be discharged only through the water discharge tube P5, and when the water softening apparatus performs the cleaning operation to clean the electrosorption unit 10, the cleaning solution and scale may be discharged into the scale discharge tube P6.

In order for a uniform amount of cleaning solution to be transferred to the electrosorption unit 10, the water supply tube P1 is provided with a constant pressure unit 30 and the cleaning solution guide tube P3 is provided with an orifice 40. The constant pressure unit 30 allows the pressure of water transferred from the external water supply source S to remain constant, thereby allowing the pressure of water transferred to the preprocessing chamber 21 to be held constant. The orifice 40 allows water to pass through the cleaning solution guide tube P3 at constant speed. Accordingly, by controlling the valve V1 to control connection time between the cleaning solution guide tube P3 and the transfer tube P4, an amount of cleaning solution transferred to the electrosorption unit 10 may be adjusted. In the present embodiment, the constant pressure unit 30 is a pressure reducing valve to lower the pressure of water below a certain level.

The following description will be given of an operation of the water softening apparatus having the above configurations.

First, when the water softening apparatus 1 performs the water softening operation, the valve V1 connects the water guide tube P2 and the transfer tube P4.

When the water guide tube P2 and the transfer tube P4 are connected, water transferred from the external water supply source S is transferred to the preprocessing chamber 21 via the water supply tube P1 and foreign matter is primarily filtered out by the filter 22 while the water passes through the preprocessing chamber 21. Subsequently, the water is transferred to the electrosorption unit 10 via the water guide tube P2 and the transfer tube P4 which are connected through the valve V1, ionized matter contained in the water is adsorbed onto the electrosorption unit 10 so that the water is softened. The softened water is discharged via the water discharge tube P5 connected to the electrosorption unit 10 so as to be used by a user.

In this case, as described above, since the valve V1 connects the water guide tube P2 and the transfer tube P4, the transfer tube P4 is closed and thus the cleaning solution in the cleaning solution storage chamber 23 may not be moved via the transfer tube P4. Accordingly, even though water pressure is applied to the diaphragm 25 through a communication hole 24a from the preprocessing chamber 21, the diaphragm 25 is not moved.

Next, when the water softening apparatus 1 performs cleaning of the electrosorption unit 10, the valve V1 connects the cleaning solution guide tube P3 and the transfer tube P4.

When the cleaning solution guide tube P3 and the transfer tube P4 are connected, water transferred from the external water supply source S is transferred to the preprocessing chamber 21 via the water supply tube P1.

Figure 3:
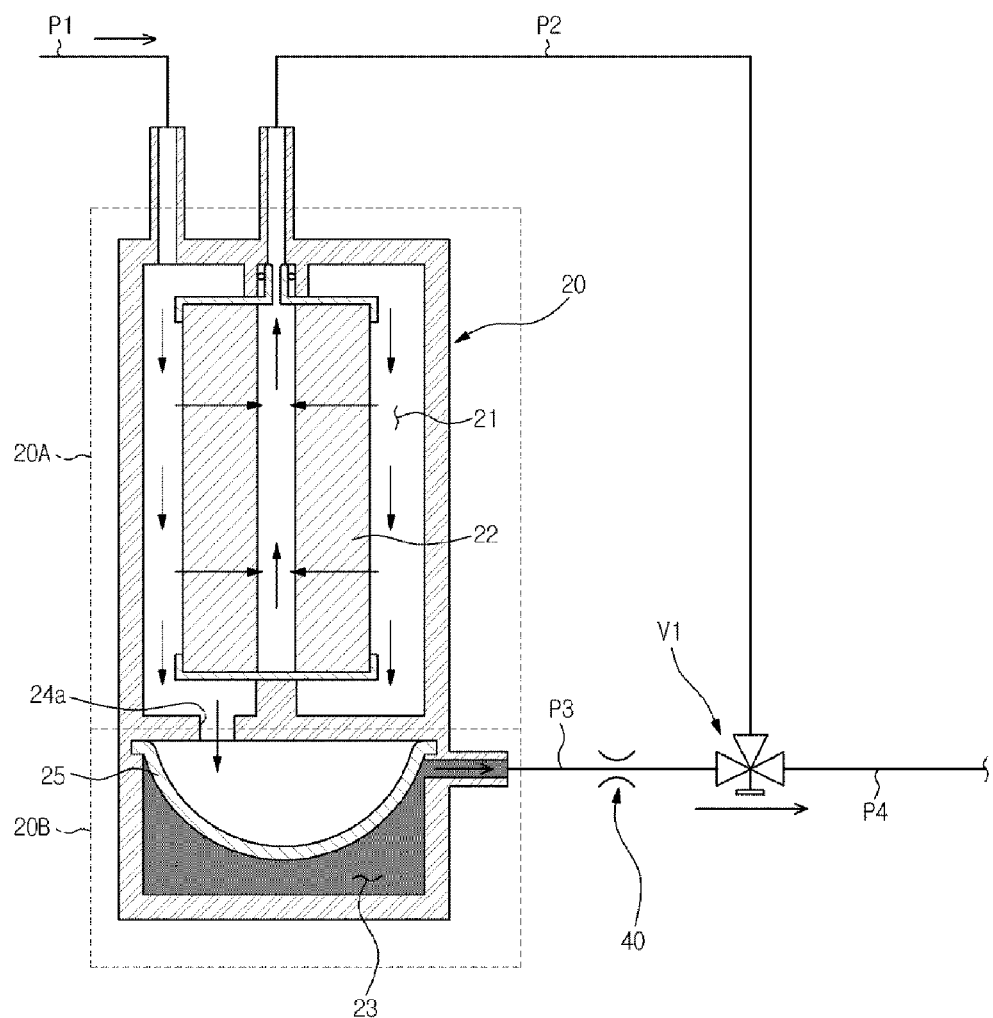
FIG. 3 is a view schematically illustrating a cleaning solution supply operation of the preprocessing unit and the cleaning solution supply unit applied to the water softening apparatus according to the embodiment.

In this case, as described above, since the valve V1 connects the cleaning solution guide tube P3 and the transfer tube P4, the water guide tube P2 is closed and thus the water in the preprocessing chamber 21 may not be moved via the water guide tube P2. Accordingly, as shown in FIG. 3, the water transferred to the preprocessing chamber 21 is transferred to the cleaning solution storage chamber 23 through the communication hole 24a to thereby push and move the diaphragm 25 disposed in the cleaning solution storage chamber 23. Due to movement of the diaphragm 25, the cleaning solution in the cleaning storage chamber 23 is injected into the electrosorption unit 10 via the cleaning solution guide tube P3 and the transfer tube P4 and is mixed with water existing in the electrosorption unit 10, thereby removing scale from the electrosorption unit 10. Water mixed with the cleaning solution and scale separated by the cleaning solution are discharged via the scale discharge tube P6 connected to the electrosorption unit 10.

As described above, the water softening apparatus 1 according to the present invention controls the valve V1 without a configuration to inject the cleaning solution, and thus the cleaning solution is transferred to the electrosorption unit 10. Therefore, a drive device such as a pump to inject the cleaning solution is unnecessary.

Figure 4:
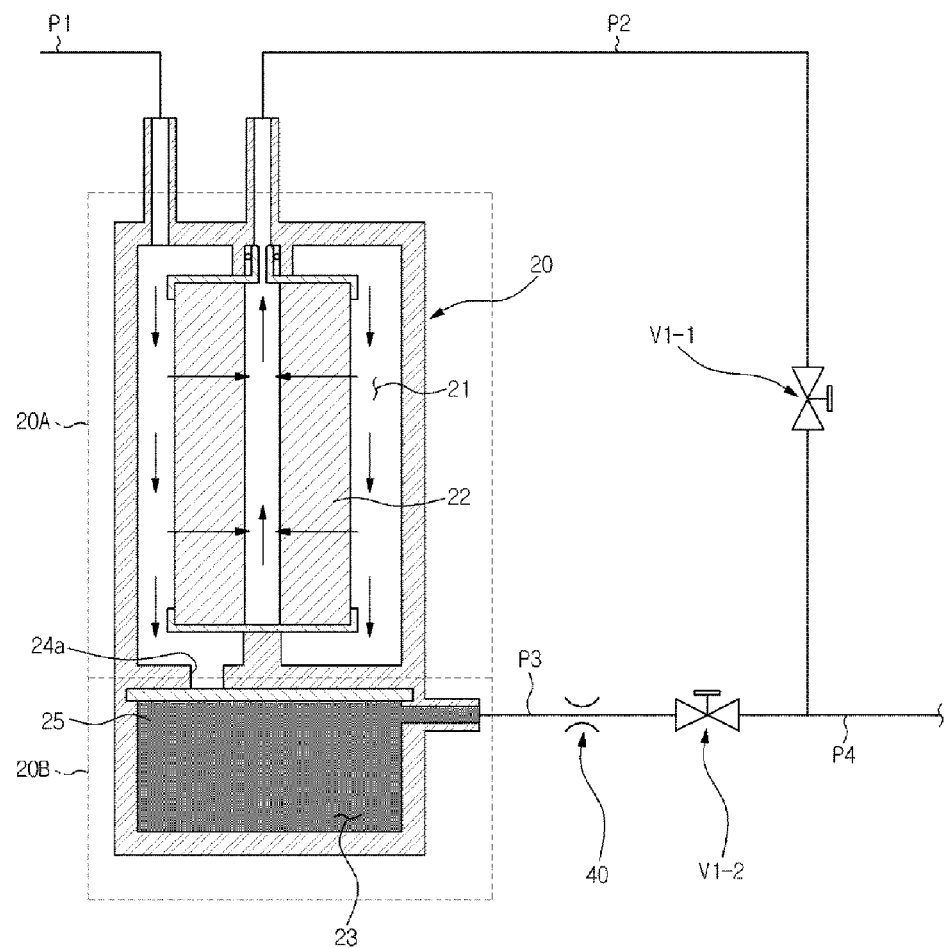
FIGS. 4 to 6 are views schematically illustrating a preprocessing unit and a cleaning solution supply unit applied to a water softening apparatus according to various other embodiments.

FIG. 4 illustrates a preprocessing unit and a cleaning solution supply unit applied to a water softening apparatus according to another embodiment.

In the present embodiment, a valve V1 includes a water valve V1-1 which is arranged at a water guide tube P2 to open and close the water guide tube P2, and a cleaning solution valve V1-2 which is arranged at a cleaning solution guide tube P3 to open and close the cleaning solution guide tube P3.

In this case, the two valves V1-1 and V1-2 may allow any one of water and a cleaning solution to be selectively transferred to an electrosorption unit 10 via a transfer tube P4 by being operated opposite to each other.

Figure 5:
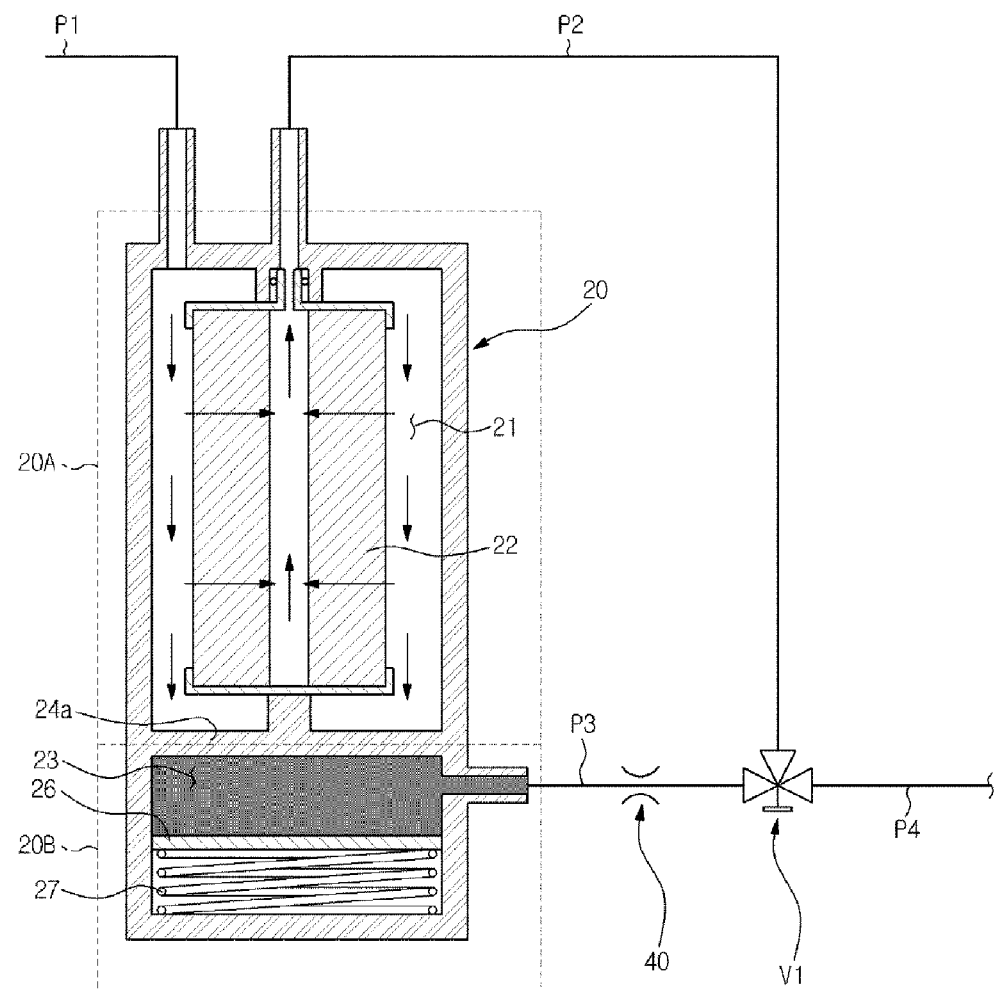

FIG. 5 illustrates a preprocessing unit and a cleaning solution supply unit applied to a water softening apparatus according to still another embodiment.

In the present embodiment, the cleaning solution supply unit 20B includes a cleaning solution storage chamber 23, a piston 26 which is movably mounted within the cleaning solution storage chamber 23, and an elastic member 27 to elastically support the piston 26.

In this case, the piston 26 is in a state of being elastically supported by an elastic restoring force of the elastic member 27. Therefore, when a cleaning solution guide tube P3 and a transfer tube P4 are connected by a valve V1, a cleaning solution is pushed while the piston 26 moves by the elastic restoring force of the elastic member 27, to thus be discharged from the cleaning solution storage chamber 23 and be transferred to an electrosorption unit 10 via the cleaning solution guide tube P3 and a transfer tube P4.

Figure 6:
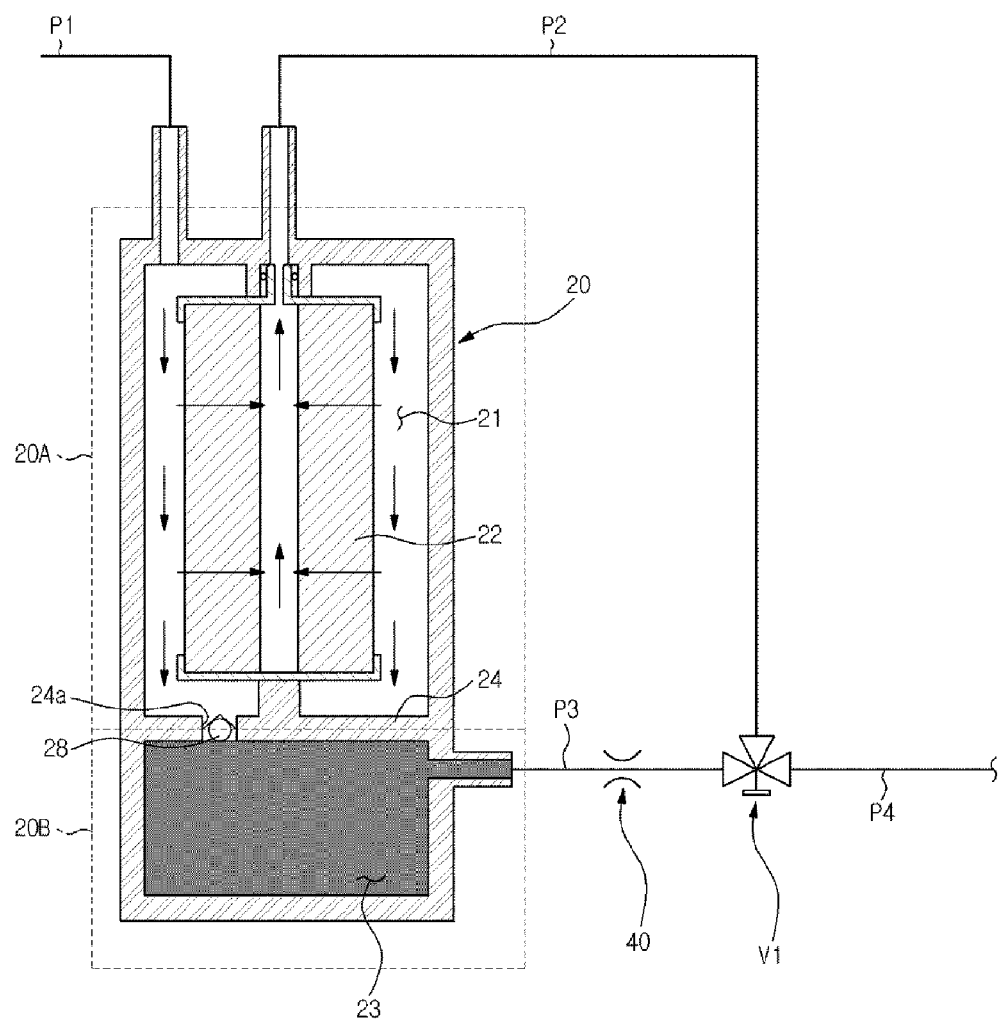

FIG. 6 illustrates a preprocessing unit 20A and a cleaning solution supply unit 20B applied to a water softening apparatus according to a further embodiment.

In the present embodiment, the cleaning solution supply unit 20B includes a cleaning solution storage chamber 23, and a check valve 28 which is disposed in a communication hole 24a and allows water in a preprocessing chamber 21 to be introduced into the cleaning solution storage chamber 23, whereas allows a cleaning solution in the cleaning solution storage chamber 23 to not be introduced into the preprocessing chamber 21.

Accordingly, when a cleaning solution guide tube P3 and a transfer tube P4 are connected by a valve V1 in a state of configuring the cleaning solution supply unit 20B, the water in the preprocessing chamber 21 passes through the check valve 28 disposed in the communication hole 24a so as to be introduced into the cleaning solution storage chamber 23 and be mixed with the cleaning solution in the cleaning solution storage chamber 23. Water and a portion of the cleaning solution mixed with the water are transferred to an electrosorption unit 10 via the cleaning solution guide tube P3 and the transfer tube P4 to clean scale within the electrosorption unit 10.

In this case, the cleaning solution supply unit 20B has a structure in which water is introduced into the cleaning solution storage chamber 23 and the cleaning solution mixed with the water is discharged from the cleaning solution storage chamber 23 to be injected into the electrosorption unit 10. Therefore, the cleaning solution in the cleaning solution storage chamber 23 is gradually diluted by water as the number of times of cleaning using the cleaning solution in the electrosorption unit 10 is increased. Accordingly, in the cleaning solution supply unit 20B having such a structure, time to inject the cleaning solution may be increased by gradually increasing connection time between the cleaning solution guide tube P3 and the transfer tube P4 through the valve V1 so as to be proportional to an increase in the number of times of cleaning.

Although the single housing 20 is provided with the preprocessing unit 20A and the cleaning solution supply unit 20B in the above embodiments are not limited thereto. For example, the preprocessing unit and the cleaning solution supply unit may also be separately configured.

As is apparent from the above description, in a water softening apparatus according to an embodiment, since a cleaning solution in a cleaning solution storage chamber is transferred to an electrosorption unit depending on an operation of a valve, a drive device to supply the cleaning solution is unnecessary, thereby enabling a structure to supply the cleaning solution to be simplified.

In addition, since a preprocessing chamber and a cleaning solution storage chamber are provided to be partitioned in a single housing and a preprocessing unit and a cleaning solution supply unit are formed in the single housing, a water softening apparatus according to an embodiment may have a simple configuration.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A water softening apparatus comprising:
   an electrosorption unit to adsorb foreign matter contained in water with electrical attraction;
   a preprocessing unit having a preprocessing chamber which is connected with an external water supply source to receive water from the external water supply source and is provided with a filter to filter out foreign matter contained in the water received from the external water supply source;
   a cleaning solution supply unit having a cleaning solution storage chamber which stores a cleaning solution to be supplied to the electrosorption unit and is connected with the preprocessing chamber to be supplied with the water from the preprocessing chamber; and
   at least one valve which allows any one of the water in the preprocessing chamber and the cleaning solution stored in the cleaning solution storage chamber to be selectively transferred to the electrosorption unit.

2. The water softening apparatus according to claim 1, wherein the cleaning solution supply unit comprises a diaphragm which moves depending on pressure of the water supplied from the preprocessing chamber.

3. The water softening apparatus according to claim 2, further comprising:
   a housing which has a partition wall therein and is provided so that the preprocessing chamber and the cleaning solution storage chamber are partitioned by the partition wall,
   wherein the partition wall is provided with a communication hole to connect the preprocessing chamber and the cleaning solution storage chamber.

4. The water softening apparatus according to claim 1, wherein the cleaning solution supply unit comprises a check valve which allows the water in the preprocessing chamber to be supplied to the cleaning solution storage chamber.

5. The water softening apparatus according to claim 4, further comprising:
   a housing which has a partition wall therein and is provided so that the preprocessing chamber and the cleaning solution storage chamber are partitioned by the partition wall,
   wherein the partition wall is provided with a communication hole which connects the preprocessing chamber and the cleaning solution storage chamber and in which the check valve is arranged.

6. The water softening apparatus according to claim 1, wherein the cleaning solution supply unit comprises a piston which is movably mounted in the cleaning solution storage chamber, and an elastic member to elastically support the piston.

7. The water softening apparatus according to claim 1, further comprising:
   a water guide tube to guide the water discharged from the preprocessing chamber;
   a cleaning solution guide tube to guide the cleaning solution discharged from the cleaning solution storage chamber; and
   a transfer tube, one end of which is connected with the water guide tube and the cleaning solution guide tube, and the other end of which is connected to the electrosorption unit.

8. The water softening apparatus according to claim 7, wherein the at least one valve comprises a three way valve which is arranged at a connection part of the water guide tube, the cleaning solution guide tube, and the transfer tube, and allows any one of the water guide tube and the cleaning solution guide tube to communicate with the transfer tube.

9. The water softening apparatus according to claim 7, wherein the at least one valve comprises a water valve which is arranged at the water guide tube to open and close the water guide tube, and a cleaning solution valve which is arranged at the cleaning solution guide tube to open and close the cleaning solution guide tube.

10. The water softening apparatus according to claim 7, further comprising an orifice which is arranged at the cleaning solution guide tube.

11. The water softening apparatus according to claim 1, further comprising:
    a water supply tube to guide the water from the external water supply source to the preprocessing chamber; and
    a constant pressure unit which is arranged at the water supply tube and allows pressure of the water transferred to the preprocessing chamber to be held constant.

12. A water softening apparatus comprising:
    an electrosorption unit to adsorb foreign matter contained in water with electrical attraction;
    a preprocessing chamber, which is provided with a filter and forms a preprocessing unit;
    a cleaning solution storage chamber, which stores a cleaning solution and forms a cleaning solution supply unit and is connected with the preprocessing chamber to be supplied with water from the preprocessing chamber;
    a housing having a partition wall therein and provided so that the preprocessing chamber and the cleaning solution storage chamber are partitioned by the partition wall; and
    at least one valve which allows any one of water in the preprocessing chamber and the cleaning solution stored in the cleaning solution storage chamber to be selectively transferred to the electrosorption unit.

13. The water softening apparatus according to claim 12, wherein:
    the housing comprises a communication hole provided at the partition wall; and
    the cleaning solution supply unit comprises a diaphragm which moves depending on pressure of the water transferred through the communication hole.

14. The water softening apparatus according to claim 12, wherein:
    the housing comprises a communication hole provided at the partition wall; and
    the cleaning solution supply unit comprises a check valve which is arranged in the communication hole and allows the water in the preprocessing chamber to be transferred to the cleaning solution storage chamber.

15. The water softening apparatus according to claim 12, wherein the cleaning solution supply unit comprises a piston which is movably mounted in the cleaning solution storage chamber, and an elastic member to elastically support the piston.

* * * * *